United States Patent [19]

Rögner et al.

[11] 4,023,362
[45] May 17, 1977

[54] CONTROLLABLE-FILLING HYDRODYNAMIC FLUID COUPLING

[75] Inventors: Thomas Rognër; Klaus Sauka, both of Crailsheim, Germany

[73] Assignee: Voith Turbo KG, Crailsheim, Germany

[22] Filed: June 22, 1976

[21] Appl. No.: 698,736

[30] Foreign Application Priority Data

June 27, 1975 Germany .................... 2528747

[52] U.S. Cl. .................... 60/347; 60/351; 60/357
[51] Int. Cl.² .................... F16D 33/06
[58] Field of Search ............ 60/347, 351, 357, 358, 60/359

[56] References Cited

UNITED STATES PATENTS

| | | | |
|---|---|---|---|
| 2,718,760 | 9/1955 | Oding | 60/359 |
| 3,156,095 | 11/1964 | Tauson | 60/351 |
| 3,210,940 | 10/1965 | Bunnelle | 60/358 |
| 3,919,844 | 11/1975 | Elderton | 60/351 X |

*Primary Examiner*—Edgar W. Geoghegan
*Attorney, Agent, or Firm*—Peter K. Kontler; John Kurucz

[57] ABSTRACT

A scoop-trimmed fluid coupling wherein the transmitted torque decreases continuously with increasing ratio of runner speed to impeller speed at each degree of filling of the working circuit with liquid. During acceleration of the runner, the scoop tube is moved by its actuator from a "circuit empty" to a "circuit full" position in several stages and at different speeds so that the torque which is transmitted by the coupling during acceleration of the runner remains substantially constant. If the load upon the runner varies from acceleration to acceleration of the runner, the operation of the actuator during acceleration of the runner is modified by a controller system which monitors the energy requirements of the prime mover for the impeller or the acceleration of the runner. The actuator is a single-acting hydraulic cylinder having one or more auxiliary ports which are permitted to admit additional pressurized fluid into the cylinder chamber in predetermined intermediate position or positions of the scoop tube during movement from the "circuit empty" to the "circuit full" position. The speed of the scoop tube can increase from stage to stage; alternatively, and especially if the load upon the runner varies from acceleration to acceleration of the runner, the stages or intervals during which the speed of the scoop tube increases alternate with stages or intervals during which the scoop tube is idle or moves backwards toward the "circuit empty" position.

12 Claims, 6 Drawing Figures

CONTROLLABLE-FILLING HYDRODYNAMIC FLUID COUPLING

BACKGROUND OF THE INVENTION

The present invention relates to hydrodynamic fluid couplings, and more particularly to improvements in controllable-filling fluid couplings whose characteristic curves (i.e., the torque transmitted by the coupling in dependency on the ratio of runner speed $n_T$ to impeller speed $n_p$ at different degrees of filling of the working circuit with working liquid) continuously slope downwardly as the ratio $n_T/n_p$ increases. Fluid couplings which exhibit such characteristics are disclosed, for example, on page 18 of the German publication entitled VDI-Richtlinien VDI 2153, Apr. 1974. Means for achieving such characteristics may include a flow restrictor which is installed in the radially inner region of the working circuit. Reference may be had to German Pat. No. 587,616.

As a rule, the extent to which the working circuit of a hydrodynamic fluid coupling is filled with working liquid is regulated by changing the rate of liquid flow from the working circuit. Such mode is preferred to the method according to which the degree of filling is regulated by changing the rate of liquid admission into the working circuit because the regulation of evacuation of liquid insures a more satisfactory withdrawal of heat during each stage of operation of the fluid coupling. As a rule, the means for evacuating working liquid comprises an adjustable scoop tube whose scooping orifice extends into a so-called scoop chamber which is a rotatable liquid reservoir chamber in communication with the working circuit. However, controlled evacuation can also be achieved by other means, e.g., by arranging radially extending openings, which are adjustable by a valve member, on the impeller of the fluid coupling. Reference may be had to German Pat. No. 1,600,974.

German patent No. 1,121,888 discloses a fluid coupling which is provided with an adjustable scoop tube (see FIGS. 5–7 of the patent) and includes means for effecting a controlled acceleration of the load. The controller means includes an actuator cylinder whose piston is connected with the scoop tube. One end face of the piston is adjacent to a cylinder chamber which can receive pressurized fluid serving to move the scoop tube toward the "circuit empty" position. The other end face of the piston is biased by a spring which tends to move the scoop tube toward the "circuit full" position. The cylinder chamber is connected to an inlet pipe which supplies liquid to the working circuit. The patent further proposes to replace the spring with a weighted lever. When the load is to be accelerated, the scoop tube initially assumes the "circuit full" position (while the inlet tube and the working circuit are still empty). As the inlet pipe begins to admit liquid into the working circuit, a portion of such liquid flows into the chamber of the actuating cylinder for the scoop tube and causes an abrupt movement of the scoop tube to the "circuit empty" position. The aforementioned spring or weighted lever thereupon begins to move the scoop tube back toward the "circuit full" position. The just described mode of acceleration of the load results in delayed filling of working circuit with liquid, i.e., it provides a longer interval of acceleration of the load. The speed of movement of the scoop tube toward the "circuit full" position varies (increases); this is intended to insure that the transmitted torque remains at least substantially constant. It has been found that the just described mode of effecting movements of the scoop tube does not prevent excessive deviations of transmitted torque from an optimum value. Moreover, the instant surge of torque at the start of acceleration (when the scoop tube still assumes the "circuit full" position) is often undesirable and/or damaging.

It was also proposed (see German OS No. 2,438,132) to provide the fluid coupling with a controller system which effects a continuous increase of the quantity of liquid in the working circuit as long as the transmitted torque does not reach a predetermined value and which prevents an increase of the quantity of liquid in the working circuit as long as the torque exceeds or equals the predetermined value. The torque is monitored by measuring the current consumption of the motor which drives the impeller of the fluid coupling. A drawback of such proposal is that the controller system is complex, expensive and prone to malfunction. This is attributable to the fact that the progress of characteristic curves which represent variations of torque at different degrees of filling of the working circuit varies considerably, i.e., certain curves are relatively flat all the way, certain curves include flat portions flanking downwardly sloping intermediate portions, and certain curves exhibit a steep downward inclination from one end to the other.

SUMMARY OF THE INVENTION

An object of the invention is to provide a fluid coupling which is constructed and assembled in such a way that the torque which is transmitted during acceleration of the load can be regulated with a high degree of predictability and reproducibility.

Another object of the invention is to provide a fluid coupling with novel and improved means for requlating the filling of working circuit with working liquid during acceleration of load so that the transmitted torque does not deviate, or deviates negligibly, from a predetermined optimum value.

A further object of the invention is to provide a fluid coupling with novel and improved means for actuating the device which determines the degree of filling of the working circuit during acceleration of the load.

An additional object of the invention is to provide novel and improved means for actuating the scoop tube.

The invention is embodied in a hydrodynamic torque-transmitting fluid coupling of the type wherein the runner is rotatable with and relative to the impeller and defines with the impeller a toroidal working circuit for a working liquid, wherein the torque which is transmitted at any degree of filling of working circuit with working liquid (e.g., water or oil) decreases continuously (or does not increase) when the ratio of runner speed to impeller speed increases, and wherein the working circuit is connected to a source of liquid (e.g., an oil pump which draws liquid from a tank).

The invention resides in the combination of an adjustable scoop tube or other suitable means for regulating the rate of filling of the working circuit with working liquid with novel and improved means for moving the scoop tube (or another device which is movable between a "circuit empty" first position and a "circuit full" second position through a plurality of intermediate positions) between the first and second positions. The moving means includes an actuator (e.g., a single-acting hydraulic or pneumatic cylinder whose piston is connected with the scoop tube) which is operable to move the scoop tube to and between the aforementioned positions and means (such as ports, conduits and fluid flow regulating means) for operating the actuator to thereby move the scoop tube from the first to the second position at different speeds and in a plurality of stages during each acceleration of the runner. Such stages include a first stage or interval during which the scoop tube moves from the first position at a first speed and a second stage during which the scoop tube moves toward the second position at a higher second speed. The number of stages may exceed two, and successive stages during which the scoop tube moves at a progressively higher speed can alternate with stages of idleness of the scoop tube and/or with stages of movement of the scoop tube toward the first position, as long as the torque which is transmitted during acceleration of the runner remains at least substantially constant.

The speed of the scoop tube can be increased by admitting increasing quantities of pressurized fluid to the chamber of the actuator cylinder or by programming the speed of a motor for the scoop tube so that the speed of the motor increases whenever the scoop tube reaches a predetermined intermediate position on its way from the first to the second position.

The novel features which are considered as characteristic of the invention are set forth in particular in the appended claims. The improved fluid coupling itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
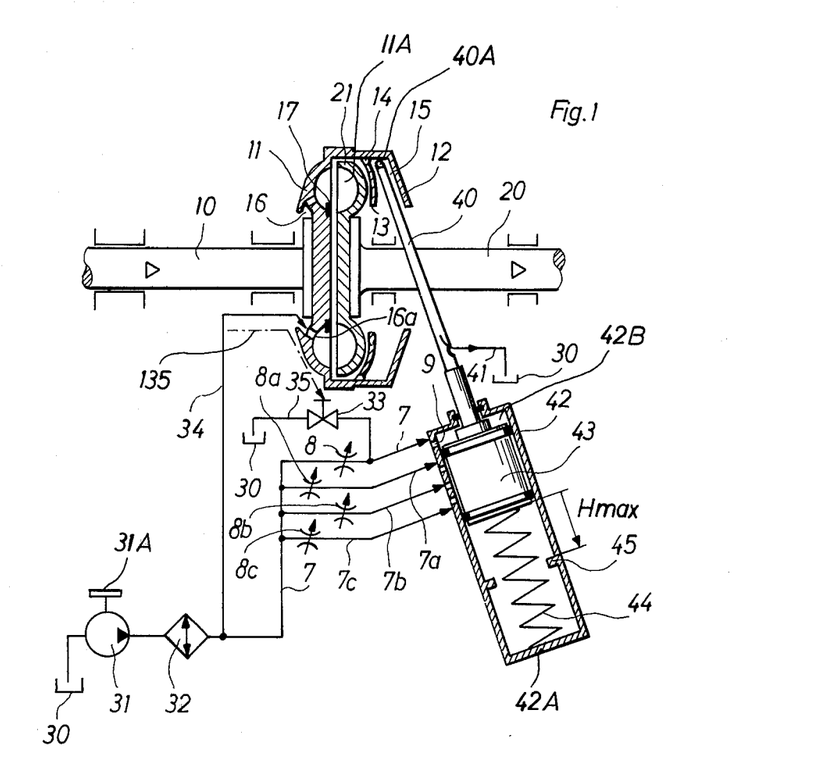
FIG. 1 is a diagrammatic partly sectional view of a hydrodynamic scoop-trimmed fluid coupling which embodies one form of the invention.

Referring first to FIG. 1, there is shown a scoop-trimmed fluid coupling which comprises an input shaft 10 receiving torque from a suitable prime mover (such as the electric motor 56 shown in FIG. 4), a vaned driving wheel or impeller 11 which is rigid with the input shaft 10, an annular shell 12 which constitutes the outer wall of a scoop chamber 15, an annular partition 13 which is affixed to the shell 12 and constitutes the inner wall of the scoop chamber 15, a vaned driven wheel or runner 21 which is disposed between the impeller 11 and partition 13 and defines with the impeller a toroidal working circuit 11A in communication with the scoop chamber 15 by way of several openings 14 at the radially outermost part of the working circuit 11A, and an output shaft 20 which receives torque from the runner 21 and transmits motion to the input element (load) of a machine or apparatus, e.g., to a driver pulley or to a roller for a conveyor belt, not shown. The gap between the impeller 11 and runner 21 and the combined cross-sectional area of openings 14 are selected with a view to insure at least substantially unobstructed flow of hydraulic working liquid (e.g., oil) between the working circuit 11A and the scoop chamber 15.

The working circuit 11A receives pressurized working liquid from a reservoir or sump 30 through the medium of a motor-driven pump 31. Pressurized liquid flows through a cooling unit 32 and enters the working circuit 11A by way of an inlet pipe 34 discharging into an annular compartment 16 which is located at the rear side of the impeller 11 and communicates with the working circuit 11A via openings 16A.

Figure 2:
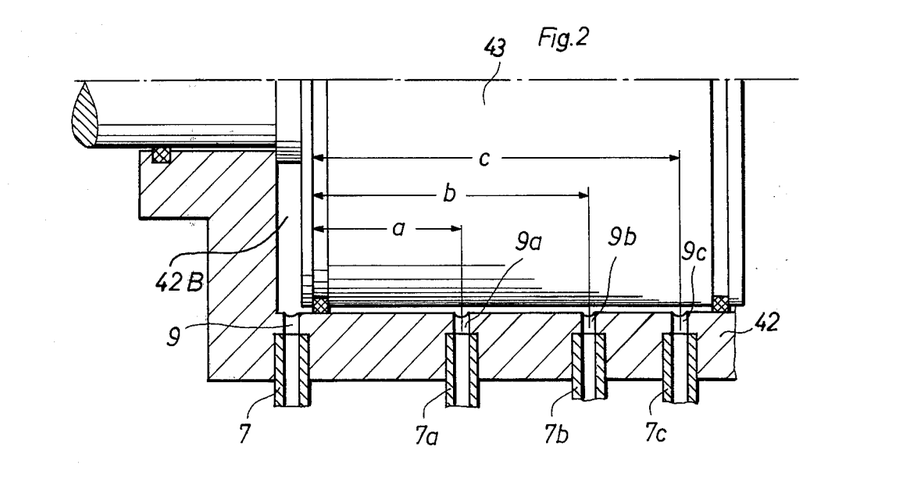
FIG. 2 is an enlarged fragmentary axial sectional view of the actuator cylinder for the scoop tube in the fluid coupling of FIG. 1.

The means for removing or evacuating hydraulic working liquid from the working circuit 11A comprises an adjustable trimming scoop tube 40 whose scooping orifice 40A extends into the scoop chamber 15. The rear or discharge end of the scoop tube 40 is in communication with a flexible conduit 41 (e.g., hose) which discharges working liquid into the sump 30. The actuator means for adjusting the position of the orifice 40A of the scoop tube 40 relative to the scoop chamber 15 (as considered radially of the output shaft 20) comprises a single-acting hydraulic cylinder 42 having a piston 43 which is rigid with the scoop tube 40 and is biased upwardly, as viewed in FIG. 1, by a helical spring 44 which reacts against the bottom end wall 42A of the cylinder 42. The spring 44 tends to maintain the piston 43 in the illustrated end position corresponding to that ("circuit empty") end position of the scoop tube 40 in which the latter evacuates all working liquid from the circuit 11A between the impeller 11 and runner 21. In such end position of the scoop tube 40, the orifice 40A is located at a maximum distance from the axis of the output shaft 20, i.e., in the outermost region of the scoop chamber 15 and close to the annulus of openings 14. The scoop tube 40 can be moved to the other ("circuit full") end position in response to admission of pressurized hydraulic fluid into the cylinder chamber 42B. In such end position, the tube 40 allows for complete or maximum filling of the working circuit 11A with working liquid. The means for admitting pressurized fluid to the chamber 42B comprises a supply conduit 7 which branches off the inlet pipe 34 and communicates with a radially disposed port 9 (see also FIG. 2) in the cylindrical wall of the cylinder 42.

The fluid coupling of FIG. 1 can be engaged by actuating the means (schematically indicated at 31A) for starting the motor for the pump 31 and by closing a diverter valve 33 in a relief or return conduit 35 which connects the supply conduit 7 with the sump 30. The conduit 7 then supplies pressurized fluid to the chamber 42B via port 9, and the piston 43 begins to move against the opposition of spring 44. The maximum stroke Hmax of the piston 43 is determined by an annular stop 45 in the interior of the cylinder 42.

In order to disengage the fluid coupling of FIG. 1, the operator arrests the motor for the pump 31 and opens the diverter valve 33 so that the spring 44 is free to expand and to rapidly expel fluid from the chamber 42B into the sump 30 via relief conduit 35. Such evacuation of fluid from the chamber 42B, whereby the working circuit 11A of the fluid coupling is emptied, prevents an abrupt surge of torque in the event that the prime mover has been arrested and is then started again.

In order to insure that the fluid coupling can transmit a substantially constant torque during acceleration of the runner 21 and output shaft 20 (with the machine which receives torque from shaft 20) from zero speed to normal operating speed, the speed at which the piston 43 moves the scoop tube 40 from the illustrated "circuit empty" position to the "circuit full" position must undergo controlled acceleration. In accordance with a feature of the invention, such controlled acceleration is achieved by the provision of at least one but preferably two or more additional or auxiliary conduits 7a, 7b, 7c which branch off the supply conduit 7 at different distances from the port 9 and admit pressurized fluid to additional or auxiliary ports 9a, 9b, 9c (see FIG. 2) in the cylindrical wall of the cylinder 42. The auxiliary ports 9a, 9b, 9c are spaced apart from each other and from the port 9, as considered in the axial direction of the cylinder 42. When the scoop tube 40 assumes the "circuit empty" position of FIG. 1, the piston 43 seals the auxiliary ports 9a-9c from the chamber 42B, i.e., this chamber communicates only with the port 9 and can receive pressurized fluid only via supply conduit 7. As the piston 43 moves toward the other end position, it moves beyond the auxiliary ports 9a, 9b, 9c in such order to thereby allow for admission of fluid via supply conduit 7 as well as via auxiliary conduits 7a, 7b, 7c, depending upon the axial position of the scoop tube 40. The quantity of fluid which flows into the chamber 42B increases with the number of ports which are not sealed by the piston 43, i.e., the speed of movement of the scoop tube 40 toward the "circuit full" position increases whenever the piston 43 ceases to seal one of the auxiliary ports 9a-9c. It will be seen that the piston 43 moves the scoop tube 40 in several stages including a first or lowermost-speed stage when the chamber 42B communicates only with the port 9, a last or maximum-speed stage when the chamber 42B communicates with all four ports 9-9c, and two intermediate stages when the chamber 42B respectively communicates with the ports 9-9a and 9-9b. The conduits 7, 7a, 7b, 7c respectively contain adjustable flow restrictors 8, 8a, 8b, 8c which enable an attendant to select the rate of fluid flow through the respective conduits and to thus select the acceleration of piston 43 during the respective stage of movement of the scoop tube 40 toward that end position ("circuit full") in which the piston 43 abuts against the stop 45. The adjustable flow restrictors 8-8c constitute but one of various suitable means for regulating the rate of fluid flow into the ports 9-9c.

The number of ports in the cylindrical wall of the cylinder 42, together with the number of corresponding conduits and adjustable flow restrictors, can be increased above four or reduced to two or three, depending on the desired number of stages of acceleration of the scoop tube 40 during movement from the end position ("circuit empty") of FIG. 1. The auxiliary ports 9a-9c, the auxiliary conduits 7a-7c and the flow regulating means 8a-8c can be said to constitute a means for operating the actuator cylinder 42 so as to insure that the actuator cylinder can move the scoop tube 40 at different speeds in a plurality of stages during acceleration of the impeller 11 to at least one predetermined speed whereby such stages include a first stage or interval during which the scoop tube moves toward the "circuit full" position at a speed which is determined by the rate of admission of liquid via port 9 and three additional stages or intervals during each of which the speed of the scoop tube is higher than during the preceding interval because the cylinder chamber 42B respectively receives fluid from the conduits 7-7a, 7-7b and 7-7c.

Figure 3:
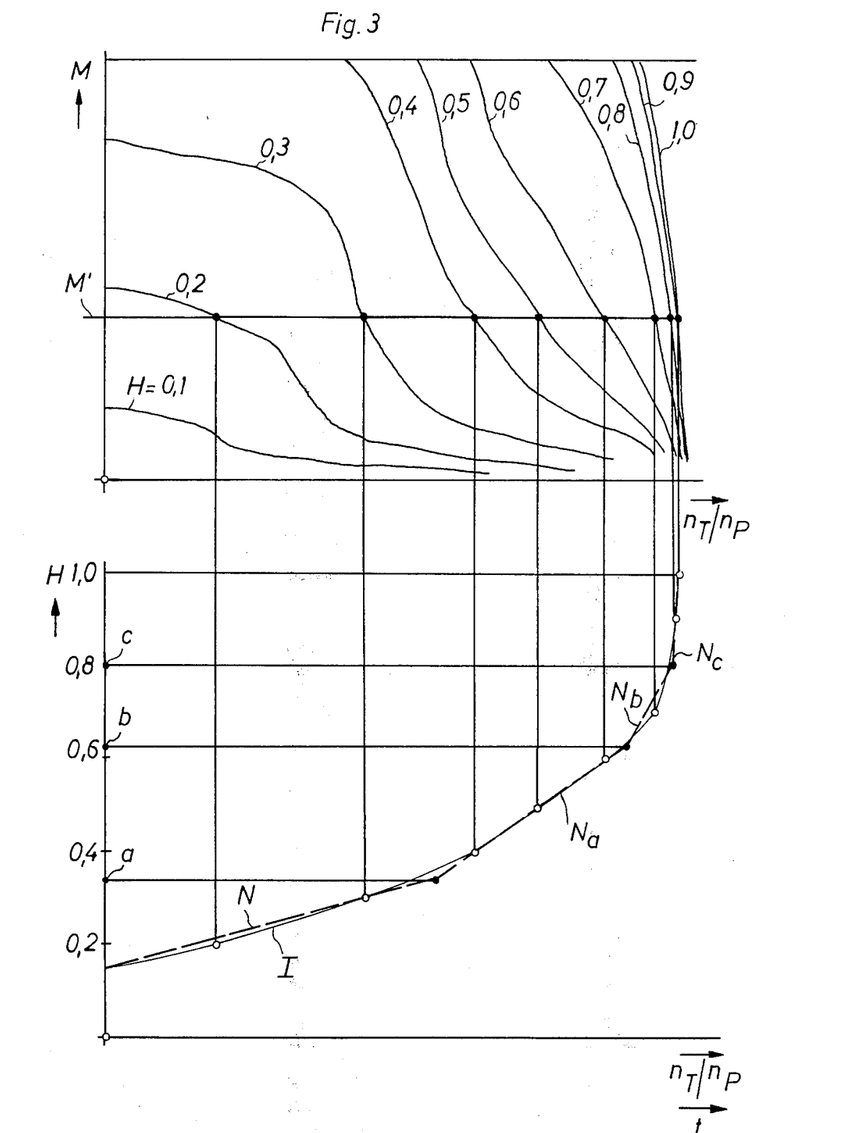
FIG. 3 is a graph showing the characteristic curves of the fluid coupling for different degrees of filling of the working circuit and the dependency of the position of scoop tube on the ratio of runner speed to impeller speed at a constant torque.

The speeds during different stages of movement of the scoop tube 40 from the "circuit empty" position of FIG. 1 and the distances between the ports 9-9c can be determined in a manner which will be described with reference to FIG. 3. Such determination is made in dependency on the characteristic curves of the fluid coupling. Each of the ten characteristic curves shown in the upper part of FIG. 3 represents the variation of transmitted torque M in dependency on the ratio $n_T/n_P$ wherein $n_T$ is the speed of the runner 21 and $n_P$ is the speed of the impeller 11. Such ratio is measured along the abscissa, and the torque M is measured along the ordinate of the coordinate system of FIG. 3. Each of the ten curves corresponds to a different position of the scoop tube 40 and hence to a different degree of filling of the working circuit 11A with working liquid. For example, the characteristic curves $H = 0.1$ represents that position of the tube 40 at which the orifice 40A is spaced apart from the "circuit empty" position of FIG. 1 by a distance corresponding to one-tenth of the maximum stroke Hmax of the piston 43. The characteristic curve $H = 1.0$ represents the other ("circuit full") end position of the tube 40 in which the piston 43 abuts against the stop 45 of the cylinder 42. The curves $H = 0.2$ to $H = 0.9$ are representative of eight intermediate positions of the scoop tube 40.

The desired (constant) torque during acceleration of the runner 21 is indicated by the horizontal line M'. The positions of the scoop tube 40 during different stages of acceleration of the runner 21 can be determined by the points of intersection of the line M' with the characteristic curves shown in the upper part of FIG. 3. The dependency of the position of scoop tube 40 on the ratio $n_T/n_P$ is illustrated in the lower part of FIG. 3. The ideal positions of the tube 40 during various stages of acceleration of the output shaft 20 are represented by the curve I; this curve further represents the ideal positions of the tube 40 as a function of the time t. It will be readily appreciated that the ideal curve I is valid only for the selected torque M'; the configuration of ideal curves for other desired starting torques deviates from the configuration of the curve I.

FIG. 3 shows that, in order to achieve a torque M' which is constant during the entire interval of acceleration of the output shaft 20 to normal operating speed, the speed of movement of the scoop tube 40 from the end position of FIG. 1 would have to vary continuously in a manner as represented by the ideal curve I. It has been found that deviations of the starting torque from that which is represented by the horizontal line M' are within an acceptable range if the speed of movement of tube 40 from the end position of FIG. 1 is increased stepwise rather than continuously (as indicated by the ideal curve I). By utilizing a cylinder 42 with four ports 9-9c, the tube 40 is accelerated in four stages at a rate as respectively indicated by the curve composed of straight sections or lines N, N$a$, N$b$ and N$c$ of FIG. 3. A curve composed of the straight lines N-N$c$ deviates only slightly from the ideal curve I. The transitions from each lower stage to the next-higher stage of acceleration of the piston 43 and tube 40 correspond to the points of intersection between the lines N-N$a$, N$a$-N$b$ and N$b$-N$c$; such points correspond to the partial strokes $a$, $b$ and $c$ of the piston 43 and determine the positions of auxiliary ports 9$a$, 9$b$ and 9$c$ in the cylindrical wall of the actuator cylinder 42.

The partial strokes $a$, $b$ and $c$ of the piston 43 can be changed by providing the cylindrical wall of the cylinder 42 with additional auxiliary ports (not shown) which are angularly and axially offset with respect to the auxiliary ports 9$a$, 9$b$ and 9$c$ and which can be connected with the auxiliary conduits 7$a$, 7$b$, 7$c$ subsequent to mounting of the cylinder 42 in a fluid coupling to thus change the configuration of the curve representing stepwise acceleration of the piston 43 from the configuration of the curve represented by straight lines N, N$a$, N$b$ and N$c$ of FIG. 3.

The characteristic curves of fluid coupling must slope downwardly (toward the abscissa of the coordinate system shown in FIG. 3), i.e., torque M must decrease continuously as the ratio $n_T/n_P$ increases. If at least one of these curves were to slope upwardly during an earlier stage of acceleration and thereupon downwardly during the next-following stage, the structure of FIG. 1 would be unable or would be less likely to insure stable operation during acceleration of the output shaft 20 from zero speed to normal operating speed. Such curves can be achieved in a number of ways, for example, by placing a ring-shaped flow restrictor 17 into the working circuit 11A in the radially inner region inner region of the impeller 11.

The improved fluid coupling can be used to transmit torque to moving parts of constant-speed conveyors, to moving parts of wire drawing, cable windings or analogous machines, as well as to moving parts of other types of machines with high moments of inertia. In such machines, damage to driven parts (such as a conveyor belt) or to the material which is being processed (e.g., a cable or wire) is prevented by insuring that the maximum starting torque does not appreciably exceed the normal torque (e.g., the starting torque should not exceed the normal torque by more than 30 percent).

Our invention is based on the recognition that adjustment of the means for changing the degree of filling of the working circuit 11A need not be continuous, i.e., that the movement of scoop tube 40 of FIG. 1 need not be accelerated at a constantly varying rate during acceleration of the load in order to insure that the torque (M') remains at least substantially constant. Thus, it is amply sufficient to insure that the positions of the scoop tube (or analogous means for changing the degree of filling of the working circuit) during acceleration of the load approximately the ideal curve I, i.e., that the curve representing such positions of the scoop tube consists of a series of straight sections as long as this curve (N, N$a$, N$b$, N$c$) approximates the ideal curve I. As explained in connection with FIG. 3, the curve representing actual positions of the scoop tube (in close approximation of the ideal curve) can be readily plotted on the basis of characteristic curves of the fluid coupling for various degrees of filling of the working circuit and of the curve (M') which represents the desired torque during acceleration of the load.

During each of several stages of movement of scoop tube 40 from the "circuit empty" toward the "circuit full" position, the speed of the piston 43 increases at a constant rate, i.e., the speed changes abruptly only when the number of conduits which admit fluid to the cylinder chamber 42B increases. Thus, and since each transition from lower to higher acceleration of the piston 43 corresponds to a given intermediate position of the scoop tube between its end positions, it is only necessary to insure that the speed of the piston 43 increases whenever the scoop tube assumes one of these intermediate positions. In other words, the actuator of FIGS. 1 and 2, accelerates the scoop tube stepwise rather than constantly whereby the speed of the scoop tube during successive stepwise accelerations preferably remains constant.

Another feature of the invention resides in the recognition that a relatively small number of different rates of acceleration of the piston 43 (e.g., three, four or five) suffices to insure that the curve which is indicative of the positions of the scoop tube 40 during acceleration deviates only slightly from the ideal curve I. The minor deviations of curve N, N$a$, N$b$, N$c$ from the ideal curve do not result in appreciable deviations of actual torque from the desired torque (M'). The relatively small number of different rates of acceleration renders it possible to control the movements of the scoop tube by resorting to a relatively simple and inexpensive actuator arrangement. The improved actuator arrangement further exhibits the advantage that the acceleration of scoop tube during each part of the piston stroke can be regulated within a wide range (by the flow restrictors 8-8$c$) so that the configuration of the curve N, N$a$, N$b$, N$c$ can be changed to closely approximate the ideal curve. Moreover, the duration of each stage of acceleration of the scoop tube can be selected practically at will by appropriate distribution of auxiliary ports 9$a$-9$c$ and/or by the provision of additional auxiliary ports which are connectable to the auxiliary conduits 7$a$-7$c$ in lieu of the ports 9$a$-9$c$. Furthermore, if such additional auxiliary ports are provided in addition to the adjustable flow restrictors 8-8$c$, the actuator arrangement of FIG. 1 can change the rate of acceleration during each stage as well as the duration of each stage of acceleration. This (as well as the arrangement which is shown in FIG. 1) insures such close approximation of the curve N, N$a$, N$b$, N$c$ to the ideal curve I that the fluid coupling will transmit a desired constant or nearly constant torque without requiring resort to automatic torque monitoring and regulating means.

It is theoretically possible to achieve close approximation of the curve representing the positions of scoop tube during acceleration to the ideal curve by constantly regulating the rate of fluid flow into the cylinder chamber 42B. The rate of admission of fluid could be regulated by throttling the flow of fluid into the cylinder chamber to a greater or lesser extent. However, such mode of controlling the position of the scoop tube during acceleration is much more complex and expensive; furthermore, the approximation of curve representing the positions of scoop tube during acceleration to the ideal curve is not more satisfactory as (and normally less satisfactory than) the approximation which is achieved with stepwise acceleration of the piston 43 in a manner as shown in FIG. 1.

A further important feature of the improved fluid coupling is that the actuator means for the scoop tube 40 returns the latter to the "circuit empty" position when the motor for the pump 31 is arrested. This is achieved by opening the diverter valve 33 in the return conduit 35 so that the spring 44 is free to move the piston 43 to the position of FIG. 1. The fluid coupling of FIG. 1 may include means for automatically opening the valve 33 in response to stoppage of the motor for the pump 31 or in automatic response to stoppage of the prime mover for the input shaft 10. The operative connection between the prime mover (e.g., the motor 56 of FIG. 4) and the valve 33 is indicated in FIG. 1 by a phantom line 135. The valve 33 opens when the prime mover is disconnected from its energy source so that the resilient element 44 is free to move the scoop tube 40 to the (first or "circuit open") position of FIG. 1. This insures that the working circuit 11A is always empty when the prime mover is idle and that no abrupt surge of torque can develop when the prime mover is started. It is desirable and advantageous to stop the pump 31 simultaneously with stoppage of the prime mover for the shaft 10 to insure that the admission of working liquid into the circuit 11A ceases whenever the transmission of torque to the shaft 10 is terminated or interrupted.

Figure 4:
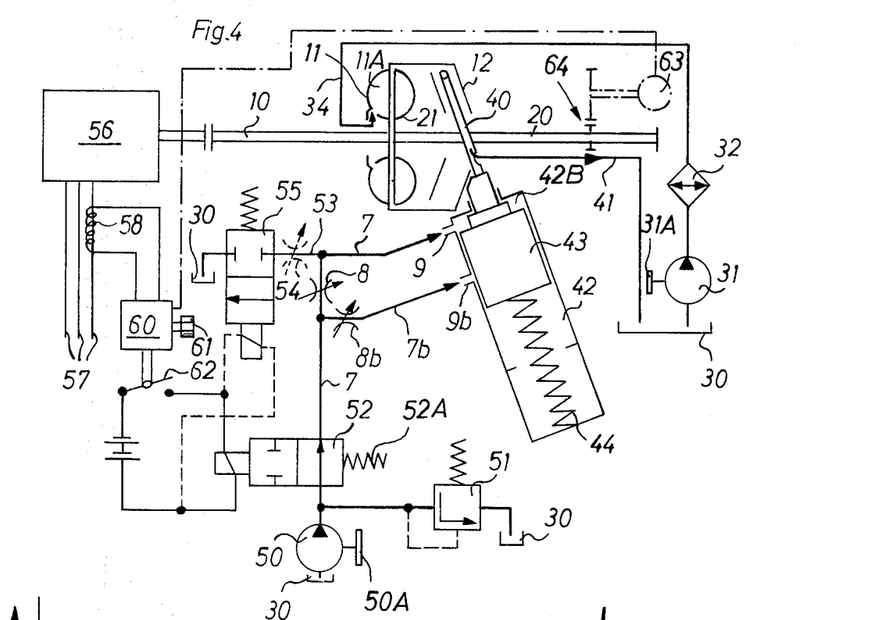
FIG. 4 is a diagrammatic view of a modified fluid coupling.

If the conditions during acceleration of a load vary within a wide range, it is desirable to provide the fluid coupling with a controller system one form of which is shown in FIG. 4 and which forms an additional component of the means for operating the actuator cylinder 42. FIG. 4 shows the fluid coupling and its auxiliary equipment in a purely diagrammatic way. All such parts of this fluid coupling which are identical with or analogous to the corresponding parts of the fluid coupling of FIG. 1 are denoted by similar reference characters. The input shaft 10 for the impeller 11 receives torque from a prime mover 56 which is an electric motor connected to an energy source 57. The pump 31 of FIG. 4 serves the sole purpose of supplying working liquid into the working circuit 11A which is defined by the vaned impeller and runner elements 11, 21. The hydraulic actuator cylinder 42 for the scoop tube 40 receives pressurized hydraulic fluid from the sump 30 by way of a discrete second motor-driven pump 50 whose output is connected with the supply conduit 7 as well as with a pressure relief safety valve 51. The supply conduit 7 contains a solenoid-operated valve 52 which is a shutoff valve, i.e., it can permit or prevent the flow of fluid from the outlet of the pump 50 into the port 9 in the cylindrical wall of the actuator cylinder 42. The cylindrical wall of the cylinder 42 has only one additional or auxiliary port 9b which can receive pressurized fluid by way of an auxiliary conduit 7b branching off the supply conduit 7. It is clear, however, that the cylinder 42 of FIG. 4 can also receive pressurized fluid by way of three or more ports, e.g., by way of four suitably spaced-apart ports as shown in FIG. 1. The conduits 7 and 7b respectively contain adjustable flow restrictors 8 and 8b. The piston 43 in the actuator cylinder 42 seals the auxiliary port 9b when the scoop tube 40 assumes the "circuit empty" position of FIG. 4. The supply conduit 7 further communicates with a relief or return conduit 53 which may contain an adjustable flow restrictor 54 and can convey fluid to the sump 30 in response to opening of a solenoid-operated diverter valve 55.

The controller system of FIG. 4 comprises a coil 58 of a commercially available current sensing unit 60. The coil 58 surrounds one lead of the connection between the energy source 57 and the motor 56. The variations of the current which is drawn from the energy source 57 are indicative of variations of torque which is transmitted by the fluid coupling of FIG. 4. The sensing unit 60 comprises means for comparing the signal (from 58) representing the current which is drawn from the energy source 57 with a reference signal (the intensity of such reference signal can be selected by way of a knob 61). If the intensities of the two signals deviate from each other to a predetermined extent, the sensing unit 60 closes an electric switch 62 which, in turn, actuates the valve 52 in the supply conduit 7. If desired, the switch 62 can also actuate the valve 55 (the operative connections between the switch 62 and the solenoid of the valve 55 are indicated by broken lines).

It is now assumed that the valve 55 remains closed during acceleration of the output shaft 20 to normal speed. The controller system of FIG. 4 then operates as follows: The acceleration begins in response to actuation of members 31A and 50A which respectively start the motors (not shown) for the pumps 31 and 50. If the current consumption of the motor 56 exceeds the rated value which is selected by the knob 61 of the sensing unit 60, the latter closes the switch 62 whereby the valving element of the valve 52 moves to its right-hand end position (as viewed in FIG. 4) and seals the port 9 from the outlet of the pump 50. This interrupts the movement of scoop tube 40 from the "circuit empty" toward the "circuit full" position. The spring 52A returns the valving element of the valve 52 to the illustrated (open) position when the intensity of signal from the coil 58 matches or is less than the intensity of the reference signal. The movement of the scoop tube 40 toward the "circuit full" position is interrupted again when the torque which is transmitted by the fluid coupling during acceleration exceeds the preselected value as determined by the setting of the knob 61.

Figures 5, 6:
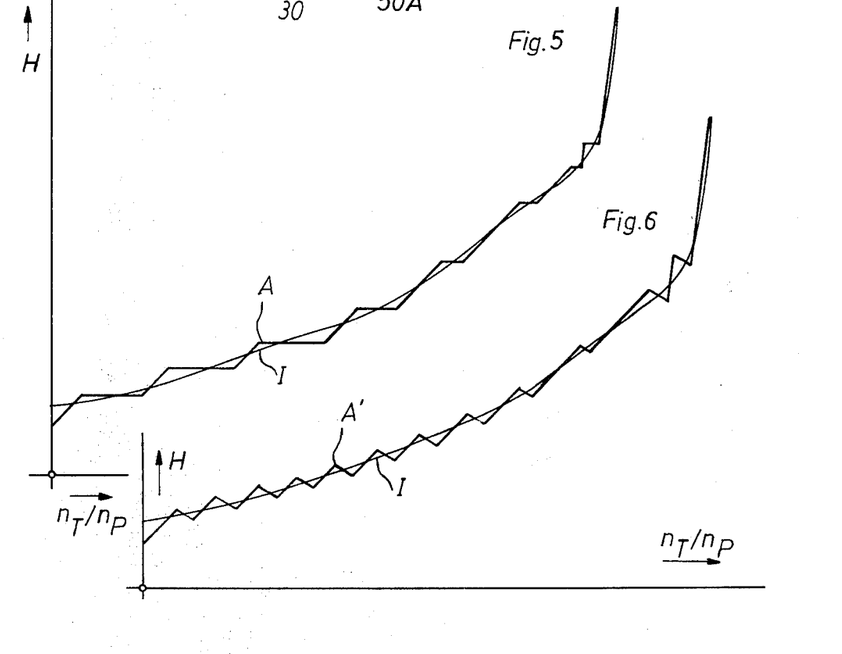
FIG. 5 is a graph showing the dependency of the position of scoop tube on the aforementioned ratio at a constant torque in the fluid coupling of FIG. 4.
FIG. 6 is a graph showing the dependency of the position of scoop tube on the aforementioned ratio at a constant torque in a fluid coupling which constitutes a modification of the structure shown in FIG. 4 by solid lines.

The manner in which the output shaft 20 is accelerated due to the provision of controller system of FIG. 4 is illustrated in FIG. 5. The reference character I denotes the ideal relationship between the position of the scoop tube 40 (i.e., the stroke of the piston 43) and the ratio $n_T/n_P$. The configuration of the ideal curve I varies in dependency on varying circumstances at different acceleration intervals. The sensing unit 60 insures that the actual position of scoop tube 40 during each stage of acceleration deviates only negligibly (i.e., within a permissible range) from the desired ideal position. The actual position of scoop tube 40 during each stage of acceleration is represented by the stepped curve A; this curve comprises upwardly sloping portions which represent those stages of acceleration of shaft 20 when the tube 40 moves toward the "circuit full" position and horizontal portions which represent the intervals of idleness of the scoop tube 40. The inclination of the upwardly sloping portions of the curve A depends on the quantity of liquid which flows into the cylinder chamber 42B, i.e., on the setting of flow restrictors 8, 8b and whether the chamber 42B receives pressurized fluid via port 9 or via ports 9 and 9b.

Deviations of the position of scoop tube 40 from ideal position can be reduced still further if the switch 62 of FIG. 4 also controls the diverter valve 55 of FIG. 4. Thus, the switch 62 closes the valve 52 simultaneously with opening of the valve 55 so that, when the ports 9 and 9b are sealed from the outlet of the pump 50, the valve 55 allows fluid to flow from the cylinder chamber 42B into the sump 30. This causes the scoop tube 40 to move back toward the "circuit open" position. Such mode of controlling the movements of scoop tube from "circuit open" to "circuit full" position is represented by the curve A' of FIG. 6. This curve is a zig-zag curve which includes upwardly sloping portions (scoop tube 40 moves toward "circuit full" position) alternating with downwardly sloping portions (scoop tube moves toward "circuit open" position). The valve 55 is closed when the valve 52 opens, and vice versa. The speed at which the tube 40 moves back toward the "circuit open" position can be regulated by the adjustable flow restrictor 54 in the return conduit 53. The setting of this flow restrictor determines the inclination of the downwardly sloping portions of the curve A' of FIG. 6.

The fluid coupling of FIG. 4 can be used with particular advantage for transmission of torque to varying loads, e.g., to a conveyor belt which must be started while empty or while supporting a large quantity of commodities or bulk material which is to be moved to a given destination. The controller system enables the fluid coupling to transmit a constant or nearly constant torque during acceleration of output shaft 20 irrespective of the size of load which receives motion from the output shaft. The actuator cylinder 42 of FIG. 4 is capable, by itself, of insuring such progress of movement of the scoop tube 40 from "circuit empty" to "circuit full" position that the curve representing different positions of the scoop tube during acceleration closely approximates the ideal curve I. The adjusting action of the cylinder 42 is enhanced by the controller system including the sensing unit 60 so that the curve (A or A') representing the positions of scoop tube 40 during acceleration even more closely approximates the ideal curve I. Thus, the controller system merely serves to complement or enhance the adjusting action of the actuator cylinder 42, i.e., the controller system compensates at least in part for relatively minor deviations of the scoop tube from optimum position during the entire interval of acceleration. The controller system is simple, compact and inexpensive. As a rule, such system need not include a differentiating circuit. It has been found that the controller system of FIG. 4 (or an analogous system) invariably insures highly satisfactory (i.e., very close) approximation of the curve A or A' to the ideal curve I, even if the load upon the output shaft 20 during a first starting of the machine to be driven is substantially different from the load during the next-following starting.

The controller system of operating means for the actuator cylinder can be used to monitor the acceleration of load upon the runner 21 and output shaft 20 and to adjust the operation of the actuator cylinder whenever the monitored acceleration of the output shaft 20 deviates from a desired acceleration. Such modification is shown in FIG. 4 by phantom lines. The modified controller system does not utilize the coil 58 because it comprises an element which monitors the torque which is transmitted by the fluid coupling by determining the acceleration of shaft 20 (and of the load which receives motion from this shaft). The acceleration monitoring element is a transducer 63 whose input element is operatively connected with the shaft 20 by a gear transmission 64. The output of the transducer 63 furnishes a signal whose intensity or another characteristic is indicative of acceleration of the shaft 20, and such signal is transmitted to the unit 60. The latter compares the signal with a reference signal and controls the position of the switch 62 in the same way as described above.

As mentioned before, the scoop tube 40 constitutes but one of several means which can be used for controlled evacuation of working liquid from the circuit 11A and for regulating the rate of filling of such circuit during acceleration of the load. A different evacuating and regulating means (annular valve member) is disclosed in the aforementioned German patent No. 1,600,974. Furthermore, the actuator means for the scoop tube or other evacuating and regulating means need not invariably include a pneumatic or hydraulic cylinder and piston assembly; it is equally within the purview of the invention to utilize an electric motor or another suitable actuator structure. All that is necessary is to program the operation of the actuator so as to insure that the evacuating and regulating means is accelerated to a different extent in several stages, whereby each stage of higher acceleration can immediately follow the preceding stage of acceleration (FIG. 1), or each stage of acceleration can be followed by a stage during which the evacuating and regulating means is idle (curve A of FIG. 5) or moves backwards toward the "circuit empty" position (curve A' of FIG. 6).

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

What is claimed is:

1. In a hydrodynamic torque-transmitting fluid coupling wherein a runner is rotatable relative to an impeller and defines therewith a toroidal working circuit for a working liquid, wherein the torque which is transmitted at any degree of filling of said circuit with working liquid decreases continuously when the ratio of runner speed to impeller speed increases, and wherein said circuit is connected to a source of working liquid, a combination comprising means for regulating the degree of filling of said working circuit, including a device which is movable between a "circuit empty" first position and a "circuit full" second position by moving through a plurality of intermediate positions; and means for moving said device between said first and second positions, said moving means comprising an actuator operable to move said device to and between said positions and means for operating said actuator so as to move said device at different speeds in a plurality of stages during acceleration of said runner including a first stage during which said device moves toward said second position and a first speed and a second stage during which said device moves toward said second position at a higher second speed.

2. A combination as defined in claim 1, wherein said regulating means further comprises a scoop chamber in communication with said working circuit and said device includes a scoop tube having a scooping orifice in said scoop chamber, said actuator comprising a fluid-operated cylinder having a piston connected with said scoop tube and said operating means comprising means for admitting to said cylinder different quantities of fluid in different positions of said piston.

3. A combination as defined in claim 2, wherein said cylinder has a cylinder chamber for said piston and a wall surrounding said cylinder chamber and said piston, said fluid admitting means comprising a plurality of auxiliary ports provided in said wall and being spaced apart from each other, as considered in the axial direction of said cylinder, said piston sealing said auxiliary ports from said cylinder chamber in the first position of said scoop tube and said piston permitting successive ports to admit fluid into said cylinder chamber and to thereby accelerate said scoop tube during movement toward said second position when said tube reaches successive predetermined intermediate positions.

4. A combination as defined in claim 2, wherein said cylinder has a cylinder chamber for said piston and a wall surrounding said cylinder chamber and said piston, said fluid admitting means comprising at least one auxiliary port provided in said wall and being sealed from said chamber by said piston in said first position of said tube, said piston permitting said port to admit fluid into said chamber and to thereby accelerate said scoop tube during movement toward said second position when said scoop tube reaches a predetermined intermediate position.

5. A combination as defined in claim 4, wherein said operating means further comprises a source of pressurized fluid, conduit means connecting said last named source with said auxiliary port, and adjustable flow regulating means in said conduit means.

6. A combination as defined in claim 1, further comprising a prime mover for said impeller and means for effecting movement of said device to said first position in response to stoppage of said prime mover.

7. A combination as defined in claim 6, wherein said movement effecting means includes a resilient element.

8. A combination as defined in claim 1, wherein said operating means further comprises controller means including means for monitoring the torque which is transmitted from said impeller to said runner during acceleration of said runner and means for adjusting said actuator when the monitored torque deviates from a predetermined torque.

9. A combination as defined in claim 8, further comprising a prime mover for said impeller, said prime mover including an electric motor and an energy source connected with said motor, the energy requirements of said motor being proportional to the transmitted torque and said monitoring means including means for determining the energy requirements of said motor during acceleration of said runner.

10. A combination as defined in claim 8, wherein said adjusting means for said actuator includes means for effecting stoppage of said device on its way from said first toward said second position when the monitored torque deviates from said predetermined torque.

11. A combination as defined in claim 8, wherein said adjusting means for said actuator includes means for effecting movement of said device toward said first position when the monitored torque deviates from said predetermined torque.

12. A combination as defined in claim 1, wherein said operating means further comprises means for monitoring the acceleration of said runner and means for adjusting said actuator when the monitored acceleration deviates from a predetermined acceleration.

* * * * *